(12) United States Patent
Tang

(10) Patent No.: US 10,481,673 B2
(45) Date of Patent: Nov. 19, 2019

(54) MULTI-PORT EXTENSION FOR MULTI-RAIL POINT-TO-POINT POWER MANAGEMENT INTERFACES

(71) Applicant: Infineon Technologies Austria AG, Villach (AT)

(72) Inventor: Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 206 days.

(21) Appl. No.: 15/634,510

(22) Filed: Jun. 27, 2017

(65) Prior Publication Data

US 2018/0373311 A1 Dec. 27, 2018

(51) Int. Cl.
| | |
|---|---|
| *G06F 1/3234* | (2019.01) |
| *G06F 1/26* | (2006.01) |
| *G06F 1/3296* | (2019.01) |
| *G06F 13/42* | (2006.01) |
| *H02J 3/14* | (2006.01) |
| *H02J 1/08* | (2006.01) |
| *H02J 13/00* | (2006.01) |
| *G06F 13/364* | (2006.01) |
| *H02M 1/00* | (2006.01) |

(52) U.S. Cl.
CPC .............. *G06F 1/3253* (2013.01); *G06F 1/26* (2013.01); *G06F 1/266* (2013.01); *G06F 1/3296* (2013.01); *G06F 13/4291* (2013.01); *H02J 1/08* (2013.01); *H02J 3/14* (2013.01); *H02J 13/0003* (2013.01); *G06F 13/364* (2013.01); *H02M 2001/008* (2013.01); *H02M 2001/0012* (2013.01)

(58) Field of Classification Search
CPC .......... G06F 1/3253; G06F 1/26; G06F 1/266; G06F 1/3296; G06F 13/4291; G06F 13/364; H02J 1/08; H02J 3/14; H02J 13/0003; H02M 2001/0012; H02M 2001/008
See application file for complete search history.

(56) References Cited

U.S. PATENT DOCUMENTS

| | | | |
|---|---|---|---|
| 6,856,045 B1 | 2/2005 | Beneditz et al. | |
| 2013/0293012 A1* | 11/2013 | Song ..................... | H02J 4/00 307/24 |

(Continued)

*Primary Examiner* — Emily P Pham
(74) *Attorney, Agent, or Firm* — Murphy, Bilak & Homiller, PLLC

(57) ABSTRACT

A power converter system is provided that supports multiple voltage rails through a plurality of point-to-point power management communication buses. The power converter system includes a plurality of power converters each of which is operable to output an independent voltage rail regulated at a defined voltage level, a plurality of ports each of which is configured for point-to-point communication over a dedicated serial communication power management bus with single and multiple voltage rail support, each port being dedicated to a single serial communication power management bus, the power converter system having fewer ports than voltage rails, and configuration logic operable to flexibly assign each power converter to one of the ports based on configuration information stored in or provided to the power converter system, so that each power converter communicates over the serial communication power management bus to which the port assigned to that power converter is dedicated.

20 Claims, 3 Drawing Sheets

(56) References Cited

U.S. PATENT DOCUMENTS

| | | | |
|---|---|---|---|
| 2013/0293013 A1 | 11/2013 | Templeton et al. | |
| 2015/0171631 A1* | 6/2015 | Duell | H02J 3/46 |
| | | | 307/80 |
| 2015/0200541 A1* | 7/2015 | Gorla | H02J 1/102 |
| | | | 307/80 |
| 2016/0013643 A1* | 1/2016 | Park | H02J 3/00 |
| | | | 713/300 |
| 2016/0013654 A1* | 1/2016 | Saha | H02J 1/14 |
| | | | 307/29 |
| 2017/0054368 A1 | 2/2017 | Tschirhart | |

* cited by examiner

MULTI-PORT EXTENSION FOR MULTI-RAIL POINT-TO-POINT POWER MANAGEMENT INTERFACES

TECHNICAL FIELD

The present application relates to multi-rail, point-to-point power management interfaces, in particular multi-port extension for multi-rail, point-to-point power management interfaces.

BACKGROUND

Processors and other highly integrated electronic components require accurate voltage supplies capable of supplying large amounts of current and power while maintaining tight voltage regulation and subject to tight implementation area constraints. With increasing complexity of such electronic systems, industry trends are toward digital power management and digital command interfaces such as PMBus (Power Management Bus), AVS (Adaptive Voltage Scaling), SVID (Serial Voltage Identification), SVI/SVI2 (Switched Virtual Interface), etc. These command interfaces can be implemented in various ways, but point-to-point interfaces are highly desirable for high speed and simplicity, which has led to several multi-rail over single bus approaches where 'multi-rail' refers to multiple voltage rails each regulated at a defined voltage level.

However, the nature of point-to-point interfaces is such that the voltage rail definition must explicitly match the bus implementation, which is restricted to a single source (master) and a single destination (slave). This presents a problem as the number of voltage rails required by an electronic system increases, in that it becomes difficult to constrain specifically which voltage rails are supported over which interface, since multiple interfaces are required, and having dedicated interfaces for each rail is undesirable due to the higher implementation cost of supporting additional ports, pins and signals.

For example, by supporting multiple voltage rails over a single interface, the implementation is constrained to a single-master, single-slave configuration. However, there are several situations where a single-master approach is not suitable, such as when the voltage rails are distributed among several different physical entities, e.g. ICs or modules, and communication between the entities is limited and when the voltage rail is shared among multiple entities, all of which could benefit from having a connection to the power system management. Additionally, there are situations where a single-slave approach is not suitable, such as when the voltage rails are implemented over multiple entities, e.g. controller or integrated POLs (point-of-loads), which require their own dedicated slave interface.

A solution which improves the flexibility of multi-rail support for point-to-point power management interfaces is desirable.

SUMMARY

According to an embodiment of a power converter system supporting multiple voltage rails through a plurality of point-to-point power management communication buses, the power converter system comprises a plurality of power converters each of which is operable to output an independent voltage rail regulated at a defined voltage level, a plurality of ports each of which is configured for point-to-point communication over a dedicated serial communication power management bus with single and multiple voltage rail support, each port being dedicated to a single serial communication power management bus, the power converter system having fewer ports than voltage rails, and configuration logic operable to flexibly assign each power converter to one of the ports based on configuration information stored in or provided to the power converter system, so that each power converter communicates over the serial communication power management bus to which the port assigned to that power converter is dedicated.

According to an embodiment of an electronic system, the electronic system comprises a plurality of electrical loads each of which is configured to be powered by one or more independent voltage rails each regulated at a defined voltage level, a plurality of ports each of which is configured for point-to-point communication over a dedicated serial communication power management bus with single and multiple voltage rail support, each port being dedicated to a single serial communication power management bus, the electronic system having fewer ports than voltage rails, and configuration logic operable to flexibly assign each electrical load to one of the ports based on configuration information stored in or provided to the electronic system, so that each electrical load communicates over the serial communication power management bus to which the port assigned to that electrical load is dedicated.

According to an embodiment of an apparatus, the apparatus comprises a point-to-point power management interface, a power converter system and an electronic system. The point-to-point power management interface comprises a plurality of dedicated serial communication power management buses each of which is configured for point-to-point communication with single and multiple voltage rail support. The power converter system comprises a plurality of power converters each of which is operable to output an independent voltage rail regulated at a defined voltage level, a plurality of ports each of which is dedicated to one of the serial communication power management buses, the power converter system having fewer ports than voltage rails, and configuration logic operable to flexibly assign each power converter to one of the ports of the power converter system based on configuration information stored in or provided to the power converter system, so that each power converter communicates over the serial communication power management bus to which the port assigned to that power converter is dedicated. The electronic system comprises a plurality of electrical loads each of which is configured to be powered by at least one of the voltage rails provided by the power converter system, a plurality of ports each of which is dedicated to one of the serial communication power management buses, the electronic system having fewer ports than voltage rails, and configuration logic operable to flexibly assign each electrical load to one of the ports of the electronic system based on configuration information stored in or provided to the electronic system, so that each electrical load communicates over the serial communication power management bus to which the port assigned to that electrical load is dedicated.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide multi-port extension for multi-rail, point-to-point power management interfaces. The multi-port extension enables communication between multiple masters and multiple slaves to support a particular voltage rail implementation over a point-to-point power management interface, while allowing system interaction to occur over multiple paths. The multi-port extension maintains compatibility with standard single-port implementations, while providing flexibility of port assignment. For example, individual power converters included in a power converter system can communicate to all voltage rails in the load devices. The voltage rails can be configured to restrict interaction over specific power converters. Access to all voltage rails can be tailored to the actual system implementation and requirements. Flexibility in the end system also is increased, e.g. by allowing various power system partitions to be used.

Figure 1:
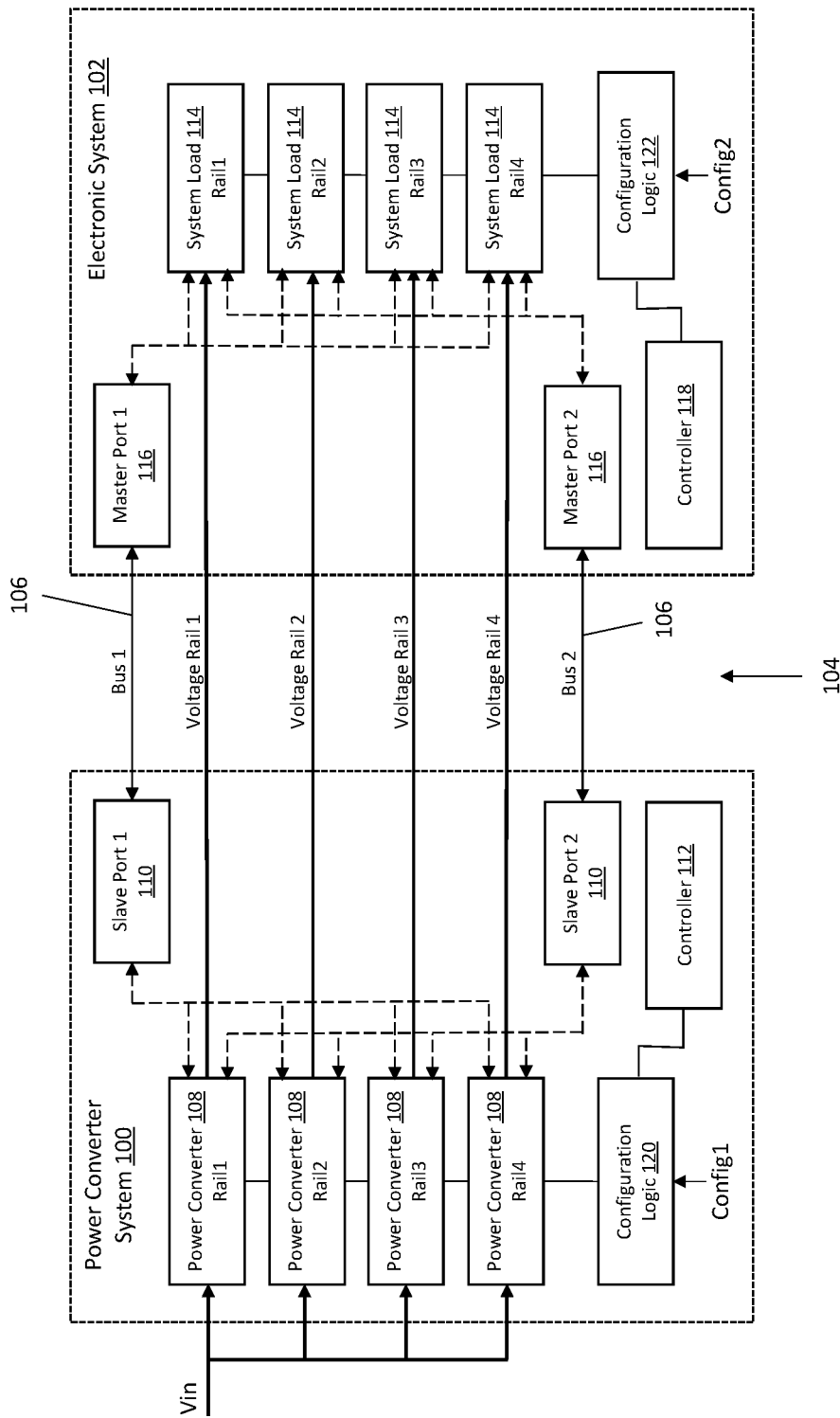
FIG. 1 illustrates a block diagram of an embodiment of an apparatus that includes a power converter system, an electronic system powered by the power converter system and a point-to-point power management interface having multi-port extension for communicating between the power converter system and the electronic system.

FIG. 1 illustrates an embodiment of an apparatus that includes a power converter system 100, an electronic system 102 powered by the power converter system 100 and a point-to-point power management interface 104 for communicating between the power converter system 100 and the electronic system 102. Any standard point-to-point power management interface 104 can be used, such as, but not limited to PMBus, AVS bus, SVID bus, SVI bus, etc. In each case, the point-to-point power management interface 104 includes a plurality of dedicated serial communication power management buses 106 each of which is configured for point-to-point communication with single and multiple voltage rail support. The dedicated buses 106 are bidirectional, have a serial interface (plus clock), have a single point of configuration (no fail safe/backup), and are used to communicate information about the voltage rail or rails required by the electronic system 102.

In one embodiment, each serial communication power management bus 106 includes a first wire for carrying clock information, a second wire for carrying information from the electronic system 102 to the power converter system 100 over the serial communication power management bus 106, and a third wire for carrying information from the power converter system 100 to the electronic system 102 over the serial communication power management bus 106. In another embodiment, each single serial communication power management bus 106 includes a first wire for carrying clock information and a second wire for carrying bidirectional information between the power converter system 100 and the electronic system 102 over the serial communication power management bus 106. Still other types of bidirectional, serial communication power management buses 106 having a single point of configuration can be used.

The power converter system 100 powering the electronic system 102 includes a plurality of power converters 108 each of which is operable to output an independent voltage rail ('Voltage Rail X') regulated at a defined voltage level, based on an input supply voltage (Vin). Each individual voltage rail provided by the power converter system 100 corresponds to a voltage supply or voltage domain e.g. in the case of an ASIC (Application-Specific Integrated Circuit) provided to the electronic system 102. The power converters 108 can be switching regulators such as switched-mode power supplies having a non-isolated topology (buck, boost, buck-boost, Cuk, SEPIC, etc.) or an isolated topology (flyback, half-bridge, full-bridge, resonant, quasi-resonant, etc.), linear regulators, etc. The power converters 108 can be single-phase or multi-phase. For example, one or more of the power converters 108 can be a single-phase converter and one or more other ones of the power converters 108 can be a multi-phase converter. A single-phase converter outputs a single voltage rail, whereas a multi-phase converter outputs multiple voltage rails at the same or different defined voltage levels. The power converters 108 can be integrated in the same package or board, or distributed across different packages and/or boards. For example, the power converters 108 can be implemented as POL (Point-Of-Load) power supplies which are individual power supply regulators (e.g. linear or DC-DC) placed close to the point of use. The above description of the power converters 108 is intended to be exemplary in nature, and should not be construed as limiting. Still other power converter types and configurations are contemplated.

The power converter system 100 also includes a plurality of ports 110 each of which is dedicated to one of the serial communication power management buses 106 of the point-to-point power management interface 104. Each port 110 of the power converter system 100 provides a physical connection to the corresponding serial communication power management bus 106 assigned to that port 110. The ports 110 include the necessary pins and logic for implementing a communication protocol over the point-to-point power management interface 104. A controller 112 of the power converter system 100 implements higher-level signalling over the respective ports 110. The power converter system controller 112 also can communicate information associated with one of the power converters 108 over the serial communication power management bus 106 to which the port 110 assigned to that power converter 108 is dedicated. For example, the power converter system controller 112 can communicate information such as, but not limited to interrupt requests, fault notifications, read register contents, bus identification, voltage rail identification, voltage input/output telemetry data, current input/output telemetry data, power input/output telemetry data, power efficiency telemetry data, temperature telemetry data, voltage change status, power management status, etc. to the electronic system 102 over the corresponding serial communication power management bus 106 of the point-to-point power management interface 104. In general, the power converter system 100 has fewer ports 110 than voltage rails. FIG. 1 shows 4 voltage rails and 2 power converter system ports 110. However, this is only an example. The power converter system 100 can provide any number of voltage rails and can have any number of ports 110, so long as the number of ports 110 is less than the number of independent voltage rails.

On the load side, the electronic system 102 includes a plurality of electrical loads 114 each of which is configured to be powered by at least one of the voltage rails provided by the power converter system 100. The electrical loads 114 can be processors, ASICs or other highly integrated electronic components that utilize accurate voltage supplies capable of supplying large amounts of current and power while maintaining tight voltage regulation. The electrical loads 114 can be integrated in the same package or board, or distributed across different packages and/or boards. In some cases, at least some of the electrical loads 114 can correspond to logic domains of an ASIC powered by different voltage rails. The above description of the electrical loads 114 is intended to be exemplary in nature, and should not be construed as limiting. Still other electrical load types and configurations are contemplated.

Like the power converter system 100, the electronic system 102 also includes a plurality of ports 116 each of which is dedicated to one of the serial communication power management buses 106 of the point-to-point power management interface 104. Each port 116 of the electronic system 102 provides a physical connection to the corresponding serial communication power management bus 106 assigned to that port 116. As explained above, the ports 116 include the necessary pins and logic for implementing a communication protocol over the point-to-point power management interface 104. A controller 118 of the electronic system 102 implements higher-level signalling over the respective ports 116. The electronic system controller 118 can communicate information associated with one of the electrical loads 114 over the serial communication power management bus 106 to which the port 116 assigned to that electrical load 114 is dedicated. For example, the power converter system controller 118 can communicate commands such as, but not limited to voltage rail address for a specific command, all voltage rail addresses, write register command, read register command, output voltage command, power mode command, configuration command, status/fault clear command, telemetry command, etc. to the power converter system 100 over the corresponding serial communication power management bus 106 of the point-to-point power management interface 104.

The electronic system 102, like the power converter system 100, has fewer ports 116 than voltage rails. Accordingly, the point-to-point power management interface 104 has fewer dedicated serial communication power management buses 106 than the number of voltage rails provided by the power converter system 100.

The electronic system 102 can have the same or different number of ports 116 as the power converter system 100. The ports 110 of the power converter system 100 are labelled 'Slave' and the ports 116 of the electronic system 100 are labelled 'Master' in FIG. 1, to indicate a master-slaver relationship in which the electronic system 102 exerts control over the power converter system 100, e.g. by providing commands to the power converter system 100 over the point-to-point power management interface 104.

The power converter system 100 and the electronic system 102 each include configuration logic 120, 122 for flexibly assigning the respective ports 110/116 to the respective power converters/electrical loads 108/114. The configuration logic 122 of the electronic system 102 can be included in or associated with the controller 118 of the electronic system 102, and flexibly assigns each electrical load 114 to one of the ports 116 of the electronic system 102 based on configuration information (Config2) stored in or provided to the electronic system 102 so that each electrical load 114 communicates over the serial communication power management bus 106 to which the port 116 assigned to that electrical load 114 is dedicated. The configuration logic 120 of the power converter system 100 can be included in or associated with the controller 112 of the power converter system 100, and flexibly assigns each power converter 108 to one of the ports 110 of the power converter system 100 based on configuration information (Config1) stored in or provided to the power converter system 100 so that each power converter 108 communicates over the serial communication power management bus 106 to which the port 110 assigned to that power converter 108 is dedicated.

The configuration logic 120, 122 on the power converter side and on the electronic system side can dynamically or statically (e.g. at start-up) flexibly assign the respective ports 110/116 to the respective power converters/electrical loads 108/114. In one embodiment, the configuration information upon which the flexible port assignments are based comprises system configuration bits which indicate power converter-to-port assignments for the power converters 108 on the power converter system side and load-to-port assignments for the electrical loads 114 on the electronic system side.

The assignments available between each port 110 and the power converters 108 of the power converter system 100, and between each port 116 and the electrical loads 114 of the electronic system 102 are illustrated as dashed lines in FIG. 1. For example, three of the power converters 108 shown in FIG. 1 can be assigned to 'Slave Port 1' and the remaining power converter 108 can be assigned to 'Slave Port 2', or two of the power converters 108 can be assigned to 'Slave Port 1' and the other two power converter 108 can be assigned to 'Slave Port 2', etc. The same applies for the ports 116 of the electronic system 102, i.e. three of the electrical loads 114 shown in FIG. 1 can be assigned to 'Master Port 1' and the remaining electrical load 114 can be assigned to 'Master Port 2', or two of the electrical loads 114 can be assigned to 'Master Port 1' and the other two electrical loads 114 can be assigned to 'Master Port 2', etc.

Regardless of the actual port to power converter/electrical load assignments made on the power converter and electronic system sides, 'Master Port 1' has a bidirectional point-to-point communication link with 'Slave Port 1' via the serial communication power management bus 106 labelled 'Bus 1' and 'Master Port 2' has a bidirectional point-to-point communication link with 'Slave Port 2' via the serial communication power management bus 106 labelled 'Bus 2' in FIG. 1. The number of ports 110/116 on the power converter and electronic system sides and hence the number of dedicated serial communication power management buses 106 depends on the type of power converters and electrical loads employed.

By having the capability to flexibly assign the ports 110 of the power converter system 100 and the ports 116 of the electronic system 102 as described above, different power converter and electrical load types and configurations can be used while still accommodating the voltage rail requirements of the electronic system 102. For example, the power converter system 100 may need to support at least 4 different voltage rails, e.g. at least 8 different voltage rails and perhaps even up to 16 voltage rails or more (e.g. in the case of an ASIC having several voltage domains). The power converter system 100 can be physically partitioned as desired and still meet the voltage rail requirements of the electronic system 102. As the number of required voltage rails increases, flexibility remains available to assign ports 110/116 while still using fewer ports 110/116 than the number of required voltage rails.

For example, an electronic system 102 that requires 7 voltage rails can be powered by a power converter system 100 that includes a first power converter entity that outputs 4 voltage rails and a second power converter entity that outputs 3 voltage rails, or a first power converter entity that outputs 3 voltage rails and two additional power converter entities that each output 2 voltage rails, or a first power converter entity that outputs 4 voltage rails and three additional power converter entities that each output 1 voltage rail, etc. In the first case, the power converter system 100 and the electronic system 102 would each have 2 ports 110/116 to support point-to-point communication with both power converter entities. In the second case, the power converter system 100 and the electronic system 102 would each have 3 ports 110/116 to support point-to-point communication with the 3 power converter entities. In the third case, the power converter system 100 and the electronic system 102 would each have 4 ports 110/116 to support point-to-point communication with the 4 power converter entities.

In other cases, each power converter 108 can be included in a single power converter entity. For example, in the case of a 3-rail or 4-rail electronic system 102, a corresponding 3-rail or 4-rail power converter entity such as a multiphase switched mode power supply can be used as the power converter system 100. Similarly, the electrical loads 114 of the electronic system 102 can be included in a single electronic system entity or in different electronic system entities. In one embodiment, the electrical loads 114 are included in at least one of an ASIC, a processor and a memory device, and the independent voltage rails provided by the power converter system 100 are different voltage domains of the ASIC, processor and/or memory device.

Configuration options for the power converter system 100 can modify the port behaviour on the power converter side. For example, rail access can be restricted from a particular port 110. Specific commands can be restricted from a particular port 110. Specific telemetry can be restricted from a particular port 110. Conversely, telemetry over multiple ports 110 can be implemented to increase telemetry throughput. Interrupt generation can be restricted to a particular port 110. Still other port restrictions can be applied.

Figure 2:
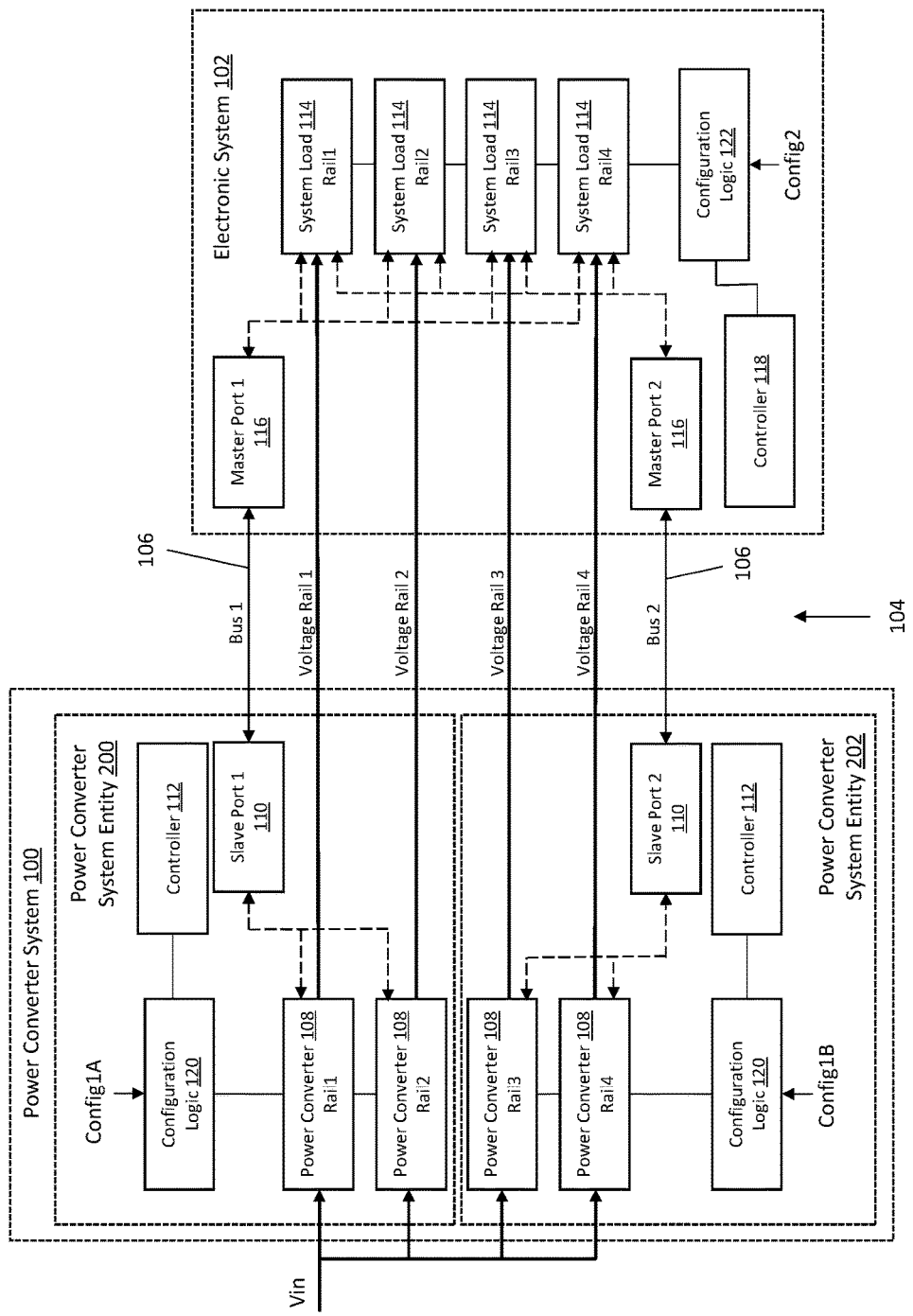
FIG. 2 illustrates a block diagram of another embodiment of an apparatus that includes a power converter system, an electronic system powered by the power converter system and a point-to-point power management interface having multi-port extension for communicating between the power converter system and the electronic system.

FIG. 2 illustrates an embodiment of the apparatus in which the power converter system 100 comprises a first power converter entity 200 having a first subset of power converters 108 ('Rail 1' and 'Rail 2') and a first port 110 ('Slave Port 1') and a second power converter entity 202 separate and distinct from the first power converter entity 200 and which includes a second subset of power converters 108 ('Rail 3' and 'Rail 4') and a second port 110 ('Slave Port 2'). According to this embodiment, the configuration logic 120 of the first power converter entity 200 flexibly assigns the first subset of power converters ('Rail 1' and 'Rail 2') to the first port ('Slave Port 1') and the configuration logic 120 of the second power converter entity 202 flexibly assigns the second subset of power converters ('Rail 3' and 'Rail 4') to the second port ('Slave Port 2') based on respective configuration information ('Config1A' and 'Config1B'). This way, each power converter 108 in the first subset of power converters ('Rail 1' and 'Rail 2') communicates over the serial communication power management bus 106 ('Bus 1') to which the first port ('Slave Port 1') is dedicated, and each power converter 108 in the second subset of power converters ('Rail 3' and 'Rail 4') communicates over the serial communication power management bus 106 ('Bus 2') to which the second port ('Slave Port 2') is dedicated.

Figure 3:
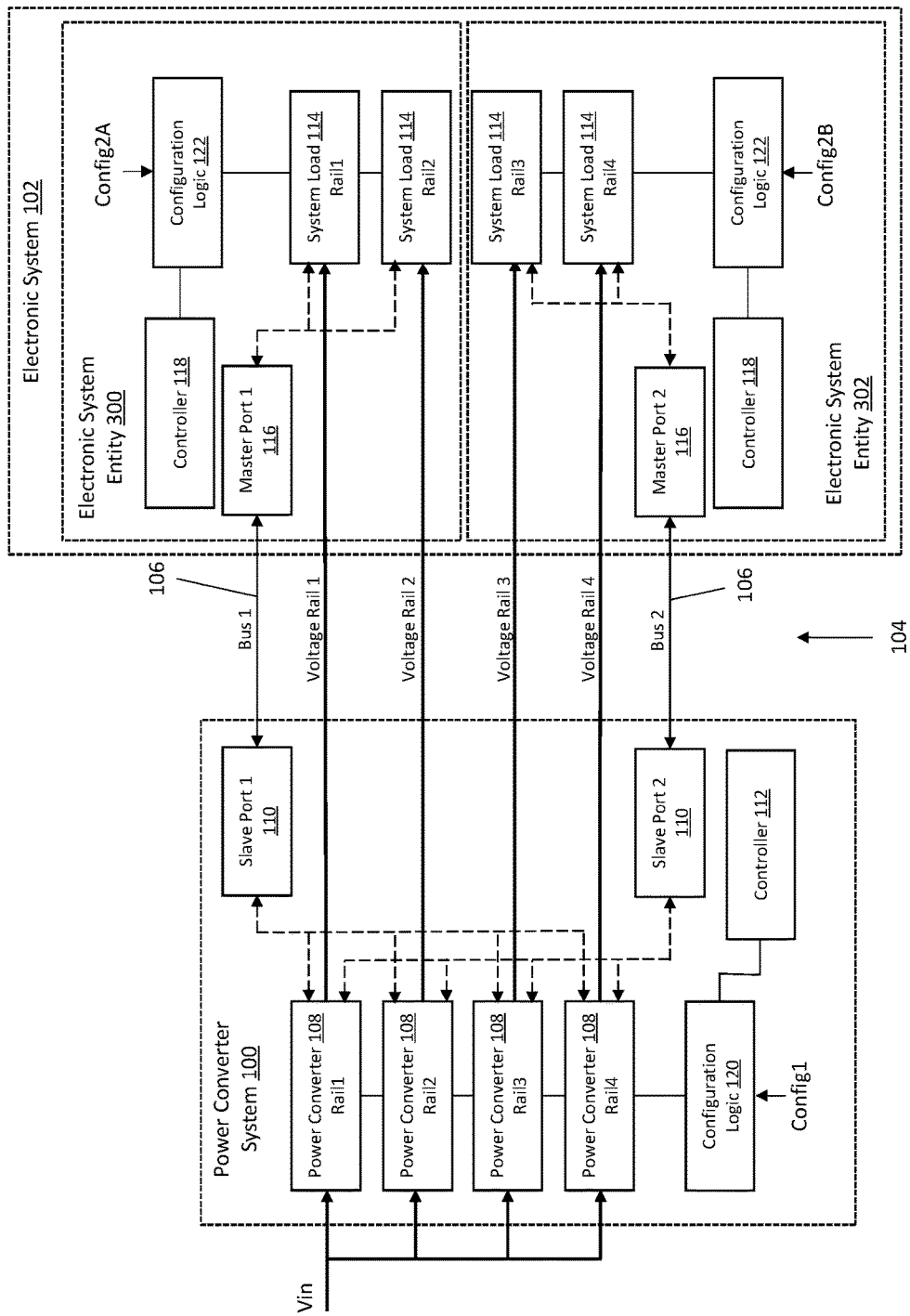
FIG. 3 illustrates a block diagram of yet another embodiment of an apparatus that includes a power converter system, an electronic system powered by the power converter system and a point-to-point power management interface having multi-port extension for communicating between the power converter system and the electronic system.

FIG. 3 illustrates an embodiment of the apparatus in which the electronic system comprises 102 a first electronic system entity 300 which includes a first subset of electrical loads 114 ('Rail 1' and 'Rail 2') and a first port 116 ('Master Port 1') and a second electronic system entity 302 separate and distinct from the first electronic system entity 300 and which includes a second subset of electrical loads 114 ('Rail 3' and 'Rail 4') and a second port 116 Master Port 2'). According to this embodiment, the configuration logic 122 of the first electronic system entity 300 flexibly assigns the first subset of electrical loads ('Rail 1' and 'Rail 2') to the first port ('Master Port 1') and the configuration logic 122 of the second electronic system entity 302 flexibly assigns the second subset of electrical loads ('Rail 3' and 'Rail 4') to the second port ('Master Port 2') based on respective configuration information ('Config2A' and 'Config2B'). This way, each electrical load 114 in the first subset of electrical loads ('Rail 1' and 'Rail 2') communicates over the serial communication power management bus 106 ('Bus 1') to which the first port ('Master Port 1') is dedicated, and each electrical load 114 in the second subset of electrical loads ('Rail 3' and 'Rail 4') communicates over the serial communication power management bus 106 ('Bus 2') to which the second port ('Master Port 2') is dedicated.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter system supporting multiple voltage rails through a plurality of point-to-point power management communication buses, the power converter system comprising:

a plurality of power converters each of which is operable to output an independent voltage rail regulated at a defined voltage level;

a plurality of ports, each of which is configured for point-to-point communication over a serial communication power management bus with single and multiple voltage rail support, each port being dedicated to the serial communication power management bus for which that port is configured, the power converter system having fewer ports than voltage rails; and configuration logic operable to flexibly assign each power converter to one of the ports based on configuration information stored in or provided to the power converter system, so that each power converter communicates over the serial communication power management bus to which the port assigned to that power converter is dedicated.

2. The power converter system of claim 1, wherein the configuration information comprises system configuration bits which indicate power converter-to-port assignments for the plurality of power converters.

3. The power converter system of claim 1, further comprising a controller operable to communicate information associated with one of the power converters over the serial communication power management bus to which the port assigned to that power converter is dedicated.

4. The power converter system of claim 1, wherein the power converter system comprises a first power converter entity which includes a first subset of the power converters and a first one of the ports and a second power converter entity separate from the first power converter entity and which includes a second subset of the power converters and a second one of the ports, and wherein the configuration logic is operable to flexibly assign the first subset of power converters to the first port and the second subset of power converters to the second port based on the configuration information, so that each power converter in the first subset of the power converters communicates over the serial communication power management bus to which the first port is dedicated and each power converter in the second subset of the power converters communicates over the serial communication power management bus to which the second port is dedicated.

5. The power converter system of claim 1, wherein each power converter is included in a single power converter entity.

6. The power converter system of claim 1, wherein each port is configured to support the serial communication power management bus dedicated to that port, wherein said serial communication power management bus includes a first wire for carrying clock information, a second wire for carrying information from an electronic system in communication with the power converter system over the serial communication power management bus, and a third wire for carrying information from the power converter system to the electronic system over the serial communication power management bus.

7. The power converter system of claim 1, wherein each port is configured to support the serial communication power management bus dedicated to that port, wherein said serial communication power management bus includes a first wire for carrying clock information and a second wire for carrying bidirectional information between the power converter system and an electronic system in communication with the power converter system over the serial communication power management bus.

8. An electronic system, comprising:
a plurality of electrical loads, each of which is configured to be powered by one or more independent voltage rails, each regulated at a defined voltage level;
a plurality of ports, each of which is configured for point-to-point communication over a serial communication power management bus with single and multiple voltage rail support, each port being dedicated to the serial communication power management bus for which that port is configured, the electronic system having fewer ports than voltage rails; and
configuration logic operable to flexibly assign each electrical load to one of the ports based on configuration information stored in or provided to the electronic system, so that each electrical load communicates over the serial communication power management bus to which the port assigned to that electrical load is dedicated.

9. The electronic system of claim 8, wherein the configuration information comprises system configuration bits which indicate electrical load-to-port assignments for the plurality of electrical loads.

10. The electronic system of claim 8, further comprising a controller operable to communicate information associated with one of the electrical loads over the serial communication power management bus to which the port assigned to that electrical load is dedicated.

11. The electronic system of claim 8, wherein the electronic system comprises a first electronic system entity which includes a first subset of the electrical loads and a first one of the ports and a second electronic system entity separate from the first electronic system entity and which includes a second subset of the electrical loads and a second one of the ports, and wherein the configuration logic is operable to flexibly assign the first subset of electrical loads to the first port and the second subset of electrical loads to the second port based on the configuration information, so that each electrical load in the first subset of the electrical loads communicates over the serial communication power management bus to which the first port is dedicated and each electrical load in the second subset of the electrical loads communicates over the serial communication power management bus to which the second port is dedicated.

12. The electronic system of claim 8, wherein each electrical load is included in a single electronic system entity.

13. The electronic system of claim 8, wherein each port is configured to support the serial communication power management bus dedicated to that port, wherein said serial communication power management bus includes a first wire for carrying clock information, a second wire for carrying information from the electronic system to a power converter system in communication with the electronic system over the serial communication power management bus, and a third wire for carrying information from the power converter system to the electronic system over the serial communication power management bus.

14. The electronic system of claim 8, wherein each port is configured to support the serial communication power management bus dedicated to that port, wherein said serial communication power management bus includes a first wire for carrying clock information and a second wire for carrying bidirectional information between the electronic system and a power converter system in communication with the electronic system over the serial communication power management bus.

15. The electronic system of claim 8, wherein the electrical loads are included in at least one of an ASIC (application-specific integrated circuit), a processor and a memory device, and wherein the independent voltage rails are different voltage domains of the at least one of the ASIC, processor and memory device.

16. An apparatus, comprising:
a point-to-point power management interface comprising a plurality of serial communication power management buses, each of which is configured for point-to-point communication with single and multiple voltage rail support;
a power converter system comprising:

a plurality of power converters, each of which is operable to output an independent voltage rail regulated at a defined voltage level;

a plurality of ports, each of which is dedicated to one of the plurality of serial communication power management buses, the power converter system having fewer ports than voltage rails; and configuration logic operable to flexibly assign each power converter to one of the ports of the power converter system based on configuration information stored in or provided to the power converter system, so that each power converter communicates over the serial communication power management bus to which the port assigned to that power converter is dedicated; and an electronic system comprising:

a plurality of electrical loads each of which is configured to be powered by at least one of the voltage rails provided by the power converter system;

a plurality of ports each, of which is dedicated to one of the plurality of serial communication power management buses, the electronic system having fewer ports than voltage rails; and configuration logic operable to flexibly assign each electrical load to one of the ports of the electronic system based on configuration information stored in or provided to the electronic system, so that each electrical load communicates over the serial communication power management bus to which the port assigned to that electrical load is dedicated.

17. The apparatus of claim 16, wherein the power converter system comprises a first power converter entity which includes a first subset of the power converters and a first one of the ports of the power converter system and a second power converter entity separate from the first power converter entity and which includes a second subset of the power converters and a second one of the ports of the power converter system, and wherein the configuration logic of the power converter system is operable to flexibly assign the first subset of power converters to the first port and the second subset of power converters to the second port so that each power converter in the first subset of the power converters communicates over the serial communication power management bus to which the first port is dedicated and each power converter in the second subset of the power converters communicates over the serial communication power management bus to which the second port is dedicated.

18. The apparatus of claim 16, wherein the electronic system comprises a first electronic system entity which includes a first subset of the electrical loads and a first one of the ports of the electronic system and a second electronic system entity separate from the first electronic system entity and which includes a second subset of the electrical loads and a second one of the ports of the electronic system, and wherein the configuration logic of the electronic system is operable to flexibly assign the first subset of electrical loads to the first port and the second subset of electrical loads to the second port so that each electrical load in the first subset of the electrical loads communicates over the serial communication power management bus to which the first port is dedicated and each electrical load in the second subset of the electrical loads communicates over the serial communication power management bus to which the second port is dedicated.

19. The apparatus of claim 16, wherein each of the plurality of serial communication power management buses includes a first wire for carrying clock information, a second wire for carrying information from the electronic system to the power converter system, and a third wire for carrying information from the power converter system to the electronic system.

20. The apparatus of claim 16, wherein each of the plurality of serial communication power management buses includes a first wire for carrying clock information and a second wire for carrying bidirectional information between the power converter system and the electronic system.

\* \* \* \* \*